Patented Sept. 25, 1945

2,385,698

UNITED STATES PATENT OFFICE 2,385,698

DISAZO DYESTUFFS

Richard Fleischhauer and Adolf Müller, Frankfort-on-the-Main-Fechenheim, Germany, assignors to General Aniline & Film Corporation, New York, N. Y., a corporation of Delaware No Drawing. Application October 24, 1940, Serial No. 362,590. In Germany October 21, 1939

3 Claims. (Cl. 260—190)

Our present invention relates to disazodyestuffs, more particularly to those of the general formula:

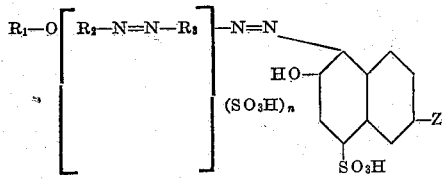

wherein $R_1$ stands for a member of the group consisting of aryl radicles of the benzene and naphthalene series, aralkyl- and alkyl radicles containing at least 6 carbon atoms, $R_2$ for a radicle of the benzene series, $R_3$ for a radicle of the naphthalene series in which the two azo groups stand in the 1 and 4 position of the naphthalene nucleus, $n$ for the number 1 or 2, Z for a member of the group consisting of hydrogen, halogen and an acylamino group, which dyestuffs dye the animal fibers from an acid or neutral bath mostly black shades of a good fastness to light, decanting, fulling, perspiration and sea water.

The new dyestuffs may be obtained by combining the diazocompounds of amino compounds of the formula:

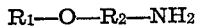
$$R_1\text{—}O\text{—}R_2\text{—}NH_2$$

wherein $R_1$ and $R_2$ have the aforesaid signification, with 1-aminonaphthalene and derivatives thereof, at least one sulfonic acid group being present either in the molecule of the diazocompound or of the 1-amino-naphthalene compound, diazotizing the aminoazodyestuff thus obtained and combining the diazocompound thus formed with 2-hydroxynaphthalene-4-sulfonic acid or a substitution product thereof.

The present new dyestuffs have the advantage, that when dyeing mixed tissues therewith effects of acetate artificial silk remain purely white. As compared with analogous dyestuffs the present dyestuffs are distinguished by a superior fastness to light.

As primary components there may be used the diazocompounds of 1-amino-4-phenoxybenzene-5-sulfonic acid, 1-amino-2-phenoxybenzene-5-sulfonic acid and their substitution products such as:

1-amino-2-(2'-methylphenoxy)-benzene- 5 -sulfonic acid,
1-amino-2-(4'-methylphenoxy)-benzene- 5 - sulfonic acid,
1-amino-2-(4'-tert.butylphenoxy) benzene-5-sulfonic acid,
1-amino-2-(3',5'-dimethyl-phenoxy) - benzene - 5-sulfonic acid,
1-amino-2-(2',5'-dimethyl-phenoxy) - benzene - 5-sulfonic acid,
1-amino-2-(2',4'-dimethyl-phenoxy) - benzene - 5-sulfonic acid,
1-amino-2-(3',4'-dimethyl - phenoxy) - benzene-5-sulfonic acid,
1-amino-2-(1'-naphthoxy)-benzene - 5 - sulfonic acid,
1-amino-2-(2'-naphthoxy)-benzene- 5 -sulfonic acid,
1-amino-2-dodecyloxybenzene-5-sulfonic acid,
1-amino-2-benzyloxybenzene-5-sulfonic acid,
1-amino-2-(2'-methyl-phenoxy)- 5 -methyl-benzene,
1-amino-2-(4'-isooctylphenoxy)-benzene,
1-amino-2-(4'-cyclohexyl-phenoxy)-benzene,
1-amino-2-(4'-isobutyl-phenoxy)-benzene Such primary components which partly have not been described hitherto in the literature, can be generally prepared by condensing aromatic halogenonitro compounds and their sulfonic acids respectively with various hydroxycompounds, particularly phenols and reducing the condensation products. It is not necessary to use pure phenols for the condensation. One may likewise condense the technical isomeric mixture as contained for example in crude cresol and crude xylenol with aromatic halogenonitro compounds. The mixtures of reduction products therefrom can be immediately used as diazo-components.

The aforesaid primary components are generally colorless to slightly gray to brownish powders, easily soluble in caustic alkali solutions, from which they may be separated by acidification with an excess of mineral acids or by adding sodium chloride or the like.

As middle components there may be named 1-aminonaphthalene, 1-amino - 2 - ethoxynaphthalene and their sulfonic acids, such as 1-aminonaphthalene-6- or -7-sulfonic acid, or 1-amino-5-hydroxy-naphthalene or 1-amino-6-hydroxynaphthalene. When the middle component contains a sulfonic acid group, primary diazocomponents not containing a sulfonic acid group may be used.

As final component besides the 2-hydroxynaphthalene-4-sulfonic acid its substitution products are suitable, which contain for instance in the 6-position chlorine or bromine or an acylamino group. The acylaminoderivatives yield particularly covered black shades. According to the acylradicle, for instance, the acetyl-, benzoyl-, benzene sulfoyl-, carboalkoxy-, chloracetyl-, β-chloropropionyl radicle the solubility and fastness properties of the dyestuffs vary to some degree.

In order to further illustrate our invention the following examples are given, the parts being by weight and all temperatures in degrees centigrade.

Example 1

24.1 parts of 1-amino-4-(4'-methyl-phenoxy)-benzene-5-sulfonic acid are diazotized and the diazosolution is combined with an aqueous solution containing 14.3 parts of 1-amino-naphthalene and 11.6 parts of a hydrochloric acid of about 30% strength. When the combination has been finished the dyestuff is isolated, dissolved in a caustic soda solution and rediazotized. The formed paste is added to a mixture of 23 parts of 2-hydroxynaphthalene-4-sulfonic acid, 25 parts of sodium carbonate and about 300 parts of water while cooling with ice and the mixture is stirred until the dyestuff formation has been finished. The dyestuff thus obtained of the formula:

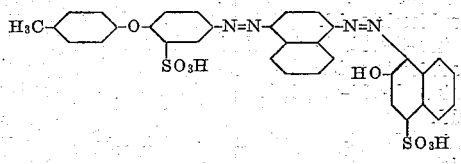

is when dry a dark water soluble powder soluble in concentrated sulfuric acid with a greenish black color and dyes wool or silk from an acid bath black shades of a very good fastness to light, decanting, fulling and perspiration.

Similar dyestuffs are obtained when starting from 1-amino-4-phenoxybenzene-5-sulfonic acid or 1-amino-4-(2'methylphenoxy)benzene-5-sulfonic acid or 1-amino-4-(4'-methylphenoxy)benzene-2-sulfonic acid or 1-amino-4-phenoxybenbene-4-sulfonic acid. The two at last named components may be prepared by treating the corresponding aminophenoxybenzenes with chlorosulfonic acid in the presence of an organic diluent.

When using 1-amino-2-ethoxynaphthalene as middle component the formed dyestuff dyes black shades of a more greenish tint.

Example 2

The diazo compound of 25.5 parts of 1-amino-2(2'-methylphenoxy)-benzene-5-sulfonic acid is combined with 14.3 parts of 1-aminonaphthalene. The formed monoazodyestuff is diazotized again and the diazocompound is combined with 23 parts of 2-hydroxynaphthalene-4-sulfonic acid in the presence of an excess of sodium carbonate or bicarbonate. The formed dyestuff of the formula:

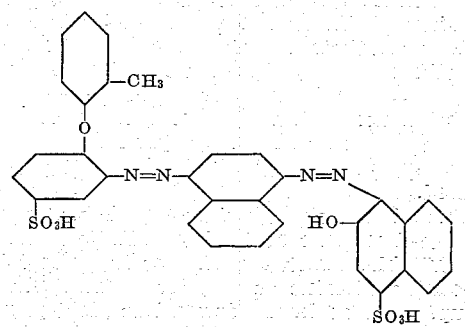

is when dry a dark water soluble powder soluble in concentrated sulfuric acid with a bluish black color and dyes wool or silk black shades of a very good fastness to light, fulling, perspiration and decanting.

When using as primary component the 1-amino-2-phenoxy-benzene-5-sulfonic acid or other substitution products thereof such as the 1 - amino - 2(4' - methyl-phenoxy)-benzene-5-sulfonic acid,
1 - amino - 2(4' - tert.butyl - phenoxy) - benzene-5-sulfonic acid,
1 - amino - 2(3' - 5' - dimethyl - phenoxy)-benzene-5-sulfonic acid,
1 - amino - 2(2' - 5' - dimethyl - phenoxy)-benzene-5-sulfonic acid,
1 - amino - 2(2' - 4' - dimethyl - phenoxy)-benzene-5-sulfonic acid,
1 - amino - 2(3' - 4' - dimethyl - phenoxy)-benzene-5-sulfonic acid,
1 - amino - 2 - benzyloxy - benzene - 5 - sulfonic acid dyestuffs of a similar shade and very good fastness properties are obtained, whereas when starting from chlorinated aminodiphenylether sulfonic acids such as the 1-amino-2(2'-chlorophenoxy)-benzene-5-sulfonic acid dyestuffs are formed dyeing black shades of a little more reddish tint. Dyestuffs of a little more reddish tint are further obtained when using 6-chloro-hydroxynaphthalene-4-sulfonic acid as final component.

Example 3

The diazo solution prepared from 18.5 parts of 1-amino-2-phenoxybenzene is combined with a neutral aqueous solution of 22.3 parts of 1-aminonaphthalene - 6 - sulfonic acid. The formed amino-azodyestuff is diazotized again and the isolated diazocompound is added in the form of a paste while cooling to a mixture of 29 parts of 2 - acetylamino-6-hydroxynaphthalene-8-sulfonic acid, 25 parts of sodium carbonate and about 300 parts of water. The dyestuff thus obtained of the formula:

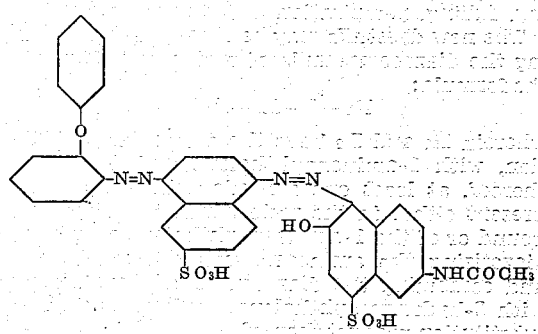

is when dry a dark water soluble powder soluble in concentrated acid with a greenish blue color and dyes wool neutral black shades of a very good fastness to perspiration and decanting.

A similar dyestuff dyeing a little more bluish black shades is obtained when using 1-aminonaphthalene-7-sulfonic acid as middle component.

When applying 2-chloroacetylamino- or 2-β-chloropropionylamino -6-hydroxynaphthalene-8-sulfonic acid as final component dyestuffs are obtained dyeing neutral black shades of a very good fastness to perspiration and decanting and a particular fastness to fulling.

Example 4

The diazocompound of 25.5 parts of 1-amino-2-(4'-methyl-phenoxy)-benzene-5-sulfonic acid is combined with 14.3 parts of 1-aminonaphthalene. The formed monoazodyestuff is diazotized again and the diazocompound thus obtained is combined in the presence of an excess of sodium carbonate with a solution of 35 parts of 2-benzoylamino - 6 - hydroxynaphthalene-8-sulfonic acid. The formed dyestuff of the formula:

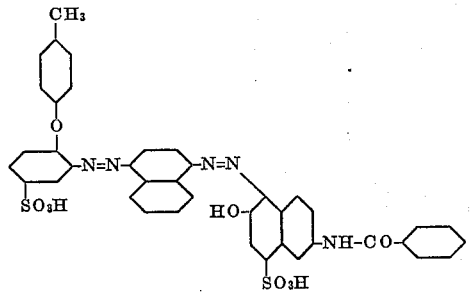

is when dry a dark watersoluble powder soluble in concentrated sulfuric acid with a dark green color and dyes wool full black shades of a good fastness to fulling, perspiration, decanting and light.

A similar dyestuff is obtained when starting from 1-amino-2-(2'-methyl-phenoxy)-benzene-5-sulfonic acid.

When using as final component 2-chloroacetylamino- and especially 2-β-chloropropionylamino-6-hydroxynaphthalene-8-sulfonic acid dyestuffs are obtained of good fastness properties and distinguished by a particularly good solubility in water. The coloration of their solution in concentrated sulfuric acid is at the beginning dark green turning to dark violet after standing for some time.

We claim:

1. Disazodyestuffs of the general formula:

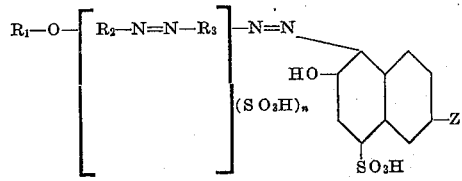

wherein $R_1$ stands for a member of the group consisting of aryl radicles of the benzene and naphthalene series, aralkyl- and an alkyl radicle containing 12 carbon atoms, $R_2$ for a radicle of the benzene series, $R_3$ for a radicle of the naphthalene series in which the two azogroups stand in the 1 and 4 position of the naphthalene nucleus, $n$ for the number 1 or 2, Z for a member of the group consisting of hydrogen, halogen and an acylaminogroup, which dyestuffs dye the animal fibers from an acid or neutral bath mostly black shades of a good fastness to light, decanting, fulling, perspiration and sea-water.

2. The disazodyestuff of the formula:

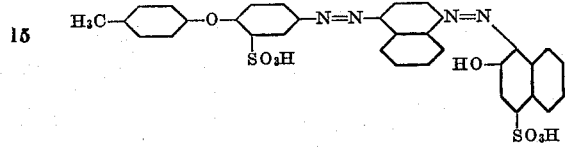

which dyestuff is when dry a dark water soluble powder soluble in concentrated sulfuric acid with a greenish black color and dyes wool or silk from an acid bath black shades of a very good fastness to light, decanting, fulling and perspiration.

3. The disazodyestuff of the formula:

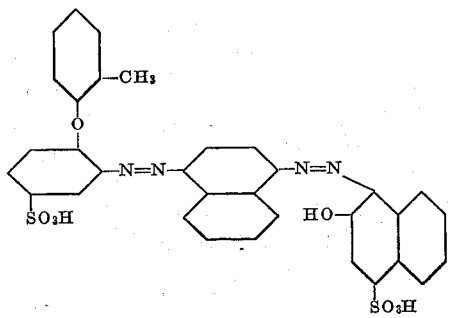

which dyestuff is when dry a dark water-soluble powder soluble in concentrated sulfuric acid with a bluish black color and dyes wool or silk black shades of a very good fastness to light, fulling, perspiration and decanting.

RICHARD FLEISCHHAUER.
ADOLF MÜLLER.